US 8,145,054 B2

(12) United States Patent
Ye et al.

(10) Patent No.: US 8,145,054 B2
(45) Date of Patent: Mar. 27, 2012

(54) SINGLE-FIBER PROTECTION IN TELECOMMUNICATIONS NETWORKS

(75) Inventors: Yinghua Ye, Woburn, MA (US); Antti Pietiläinen, Espoo (FI)

(73) Assignee: Schofield Technologies LLC, Wilmington, DE (US)

( * ) Notice: Subject to any disclaimer, the term of this patent is extended or adjusted under 35 U.S.C. 154(b) by 0 days.

(21) Appl. No.: 13/044,714

(22) Filed: Mar. 10, 2011

(65) Prior Publication Data

US 2011/0164882 A1 Jul. 7, 2011

Related U.S. Application Data

(62) Division of application No. 10/685,580, filed on Oct. 16, 2003, now Pat. No. 7,933,517.

(30) Foreign Application Priority Data

Jul. 25, 2003 (FI) ........................ 20031104

(51) Int. Cl.
H04B 10/00 (2006.01)
(52) U.S. Cl. .................. 398/3; 398/5; 398/19
(58) Field of Classification Search ............ 398/3, 5, 398/17, 19, 31
See application file for complete search history.

(56) References Cited

U.S. PATENT DOCUMENTS

| | | | |
|---|---|---|---|
| 6,327,400 B1 | 12/2001 | Harstead et al. | |
| 6,351,582 B1 * | 2/2002 | Dyke et al. | 385/24 |
| 6,414,768 B1 * | 7/2002 | Sakata et al. | 398/59 |
| 6,567,579 B2 | 5/2003 | Foltzer | |
| 6,925,264 B2 | 8/2005 | Tokita et al. | |
| 7,031,343 B1 | 4/2006 | Kuo et al. | |
| 7,072,337 B1 | 7/2006 | Arutyunov et al. | |
| 7,181,142 B1 | 2/2007 | Xu et al. | |
| 7,197,244 B2 * | 3/2007 | Thomas et al. | 398/72 |
| 7,385,995 B2 | 6/2008 | Stiscia et al. | |
| 2002/0071149 A1 | 6/2002 | Xu et al. | |
| 2003/0133460 A1 | 7/2003 | Lee et al. | |
| 2004/0008988 A1 | 1/2004 | Gerstal et al. | |
| 2004/0202174 A1 | 10/2004 | Kim et al. | |
| 2004/0208586 A1 * | 10/2004 | Kinoshita | 398/92 |

OTHER PUBLICATIONS

"Asynchronous Transfer Mode (ATM) Passive Optical Networks (PONs)," Web ProForum Tutorials, http://www.iec.org, The International Engineering Consortium, date unknown, 21 pages.
"Ethernet Passive Optical Networks," Web Proforum Tutorials, http://www.iec.org, The International Engineering Consortium, date unknown, 30 pages.
Communication from European Patent Office for European Patent Application No. 04 735 903.9 mailed May 28, 2008.
Communication from European Patent Office for European Patent Application No. 04 735 903.9,mailed Nov. 14, 2007.
English translation of First Chinese Office Action issued May 8, 2009 in Chinese Application No. 200480019284.3.

(Continued)

Primary Examiner — Dzung Tran

(57) ABSTRACT

A solution for detecting and recovering from a failure in a protected single-fiber passive optical network. A detector is used to detect the degradation in power level of optical signals. Furthermore, the invention discloses a variable symmetric split ratio approach to improve the number of splits (e.g. the number of ONUs). A single-fiber passive optical network is disclosed that uses a plurality of passive nodes connected in the optical fiber between the interfaces, wherein in the passive nodes 2-by-2 splitters/combiners are used to couple optical power from and into the optical fiber at a predetermined split ratio.

19 Claims, 8 Drawing Sheets

OTHER PUBLICATIONS

Ex parte Quayle Action on U.S. Appl. No. 10/685,580, mailed Aug. 2, 2010.
Final Office Action on U.S. Appl. No. 10/685,580, mailed Jul. 10, 2008.
Final Office Action on U.S. Appl. No. 10/685,580, mailed May 12, 2009.
International Preliminary Report on Patentability for International Application No. PCT/FI2004/000341, date of mailing Jan. 30, 2006.
International Search Report for International Application No. PCT/FI2004/000341, mailed Sep. 27, 2004.
Korean Office Action transmitted Jun. 25, 2009 for Korean Application 7025652/2008.
Non-Final Office Action on U.S. Appl. No. 12/135,874, mailed Feb. 20, 2009.
Non-Final Office Action on U.S. Appl. No. 10/685,580, mailed Oct. 17, 2007.
Non-Final Office Action on U.S. Appl. No. 10/685,580, mailed Nov. 26, 2008.
Non-Final Office Action on U.S. Appl. No. 10/685,580, mailed Apr. 10, 2007.
Non-Final Office Action on U.S. Appl. No. 10/685,580, mailed Jul. 28, 2009.
Non-Final Office Action on U.S. Appl. No. 12/135,874, mailed Aug. 18, 2009.
Non-final Office Action on U.S. Appl. No. 12/135,874, mailed Jul. 9, 2010.
Notice of Allowance on U.S. Appl. No. 10/685,580, mailed Nov. 26, 2010.
Notice of Allowance on U.S. Appl. No. 12/135,874, mailed Dec. 9, 2010.
Non-Final Office Action on U.S. Appl. No. 10/685,580, mailed Jan. 21, 2010.
Office Action for U.S. Appl. No. 12/135,874, mailed Jan. 28, 2010.
Office Action on Chinese Application 200480019284.3, issued Feb. 1, 2011.

* cited by examiner

PRIOR ART

SINGLE-FIBER PROTECTION IN TELECOMMUNICATIONS NETWORKS

CROSS-REFERENCE TO RELATED PATENT APPLICATIONS

The present application is a Divisional of U.S. patent application Ser. No. 10/685,580, filed Oct. 16, 2003, which claims priority to Finland Patent Application No. 20031104, filed Jul. 25, 2003, each of which is hereby incorporated by reference in its entirety.

BACKGROUND OF THE INVENTION

1. Field of the Invention

The invention relates to passive optical networks, and in particular to protected passive optical networks.

2. Description of the Related Art

A Passive Optical Network (PON) is a high bandwidth point-to-multipoint optical fiber network. A PON typically consists of an Optical Line Terminal (OLT), which is connected to Optical Network Units (ONU) using only cables, optical splitters and other passive components (i.e. not transmitting signals using electricity). In a PON, signals are routed in such a way that all signals reach all interim transfer points of the PON.

Passive optical network technology has been considered a very promising solution for solving the last-mile problem. Logically a PON has a tree-like structure consisting of an optical line terminal, which is located e.g. in a central office (CO), and a plurality of optical network units, e.g. 64 ONUs. The PON technology eliminates the need for active equipment in the field between OLT and ONUs, which are commonly used in conventional networks. A PON can provide, for example, a capacity of 1 Gbps. A single link failure may result in an intolerable traffic loss, which indirectly leads to revenue loss. Thus, survivability becomes important especially when a PON is applied in a fiber-to-business and cellular-transport (CT) network environment.

Generally, there are two types of survivability architectures: a 1+1 architecture and a 1:1 architecture. The 1+1 architecture uses two overlaid PONs. The traffic is bridged into both a working PON and a protection PON. Upon receiving a signal in the OLT, the traffic is selected based on signal quality. With this approach, fast protection can be achieved. However, in this architecture, no extra traffic can be supported. Compared with the no protection case, it furthermore requires double bandwidth.

In the 1:1 architecture, under normal circumstances, the normal traffic is transmitted over the working PON. Once a failure occurs, the traffic is switched into the protection PON. The protection switching is slower relative to that of the 1+1 architecture. However, compared with the 1+1 architecture, it can either significantly reduce the spare capacity requirement or carry extra low priority traffic depending on the network design.

U.S. Pat. No. 6,351,582 discloses one solution for optimizing passive optical networks. The passive optical network includes a plurality of optical splitters/combiners, each having first and second through ports and at least one drops port. The through ports of the plurality of splitters/combiners are concatenated to form a linear arrangement having two end through ports.

FIG. 1 discloses an example of the basic structure of a ring-protected passive optical network arrangement described in U.S. Pat. No. 6,351,582. In this example, the PON includes two interfaces IF1 and IF2 within an OLT unit 110, wherein IF1 operates in active mode and IF2 in standby mode. The PON comprises a plurality of passive nodes 10-13 and 15-18, which are preferably splitters/combiners and furthermore a plurality of ONUs 14 and 19. In FIG. 1, splitters/combiners 10, 11, 15 and 16 are 1-by-2 or 2-by-1 splitters/combiners that couple optical power from and into the optical fiber.

One problem in prior-art solutions and also in the solution disclosed in FIG. 1, is that an optical signal traversing through ring splitters/combiners 10 and 11 experience optical power losses at two different stages (ring splitters/combiners 10 and 11).

The prior-art passive optical networks involve further problems that have to be overcome. In an access network, the cost is a major concern since the number of users in the access network is much less than that in metro or backbone networks. Furthermore, there exists a problem of how to effectively provide protection against a single link failure in a PON based access network without significantly increasing the cost per user.

A further problem is how to implement fast fault detection in a PON. Yet a further problem is how to fast reroute the affected traffic from the working OLT to the protection OLT.

A further problem is how to solve the attenuation problem caused by protection elements.

SUMMARY OF THE INVENTION

According to a first aspect of the invention there is provided a single-fiber passive optical network which includes a first interface having a first transmitter and a first receiver, a second interface having a second transmitter and a second receiver, an optical fiber connection between the interfaces and a plurality of passive nodes connected in the optical fiber between the interfaces. In the passive nodes 2-by-2 splitters/combiners are used to couple optical power to and from the optical fiber at a predetermined split ratio.

In one embodiment, a plurality of split ratios is used among the passive nodes.

In a further embodiment, the split ratios are configured to provide variable symmetric split ratios among the passive nodes.

In a further embodiment, the single-fiber passive optical network further includes a detector in the second interface for detecting the degradation in power level of optical signals received from the first interface via the optical fiber connection, and in response to detecting, switching on the second transmitter of the second interface.

According to a second aspect of the invention there is provided a method of detecting and recovering from a failure in a protected single-fiber passive optical network including a first interface having a first transmitter and a first receiver, a second interface having a second transmitter and a second receiver, an optical fiber connection between the interfaces, a plurality of passive nodes between the interfaces, a plurality of optical network units connected to the plurality of passive nodes. The method includes sending optical signals from the first interface via the optical fiber connection to the second interface, detecting in the second interface the degradation in power level of the optical signals from the first interface, and in response to detection, switching on the second transmitter of the second interface.

In one embodiment, the method includes the step of switching on the second transmitter of the second interface when the optical power of the optical signals received with the second receiver drops below a predetermined threshold value.

In a further embodiment, the method further includes the step of switching off the second transmitter if the light level increases above the predetermined threshold value.

In a further embodiment, the method further includes the step of keeping the second transmitter switched on if the light level increases above the predetermined threshold value.

In a further embodiment, the method further comprises the step of switching the second transmitter off and again on in order to verify that the cable is still broken.

In a further embodiment, the method further comprises the step of switching off the second transmitter if detecting abrupt changes in the amount of light after switching on the second transmitter.

In a further embodiment, the method further comprises the step of switching on the second transmitter again if the light level decreases below the predetermined threshold value.

In a further embodiment, after detecting in the second interface the degradation in the power level of the optical signals from the first interface, and wherein if the first and second interfaces are located in a single optical line terminal, the method further comprises the steps of starting in the second interface an auto-discovery process to register affected optical network units, and in response to the result of the auto-discovery process, updating an internal routing table of the optical line terminal and sending the affected downstream traffic of the affected optical network units using the second interface.

In a further embodiment, after detecting in the second interface the degradation in the power level of the optical signals from the first interface, and wherein if the first and second interfaces are located in different optical line terminals, the method further comprises the steps of starting in the second interface an auto-discovery process to register affected optical network units, establishing with the second interface a dedicated path between the interfaces, sending a notifying message from the second interface to the first interface, the notifying message comprising information about the affected optical network units, forwarding the downstream traffic of the affected optical network units from the first interface to the second interface via the dedicated path and forwarding the affected upstream traffic from the affected optical network units from the second interface to the first interface via the dedicated path.

In a further embodiment, the method further comprises the step of sending from the first interface to the second interface via the dedicated path which higher layer addresses are behind the affected optical network units.

In a further embodiment, when receiving an upstream packet from the second interface, the method further comprises the steps of checking whether a packet's destination address is found in a routing table of an optical line terminal comprising the second interface, and if the destination address is found in the routing table, sending the packet according to the routing table, and if the destination address is not found in the routing table, sending the packet from the second interface to the first interface via the dedicated path.

According to another aspect of the invention there is provided a method of detecting and recovering from a failure in a protected single-fiber passive optical network including a first interface having a first transmitter and a first receiver, a second interface having a second transmitter and a second receiver, an optical fiber connection between the interfaces, a plurality of passive nodes between the interfaces, and a plurality of optical network units connected to the plurality of passive nodes. The method includes detecting in the first interface that signals are not received from at least one optical network unit, and in response to detection, switching on the transmitter of the second interface.

In one embodiment, the method further includes switching off the transmitter of the second interface if the first interface detects that the number of optical network units from which signals are not received increases.

In a further embodiment, if the first and second interfaces are located in a single optical line terminal, the method further includes starting in the second interface an auto-discovery process to register affected optical network units, and in response to the result of the auto-discovery process, updating an internal routing table of the optical line terminal, and sending the affected downstream traffic of the affected optical network units using the second interface.

Additional embodiments of this method are explained hereinafter.

In a further embodiment, if the first and second interfaces are located in different optical line terminals, the method further comprises the steps of establishing with the first interface a dedicated path between the interfaces, sending from the first interface to the second interface a message ordering to switch on the second transmitter of the second interface, starting in the second interface an auto-discovery process to register affected optical network units, sending a notifying message from the second interface to the first interface, the notifying message comprising information about the affected optical network units, forwarding the affected downstream traffic of the affected optical network units from the first interface to the second interface via the dedicated path, and forwarding the upstream traffic from the affected optical network units from the second interface to the first interface via the dedicated path.

In a further embodiment, the method further comprises the step of sending from the first interface to the second interface via the dedicated path which higher layer addresses are behind the affected optical network units.

In a further embodiment, when receiving an upstream packet via the second interface, the method further comprises the steps of checking whether the packet's destination address is found in a routing table of an optical line terminal comprising the second interface, and if the destination address is found in the routing table, sending the packet according to the routing table, and if the destination address is not found in the routing table, sending the packet from the second interface to the first interface via the dedicated path.

According to yet another aspect of the invention there is provided a protected single-fiber passive optical network including a first interface having a first transmitter and a first receiver, a second interface having a second transmitter and a second receiver, an optical fiber connection between the interfaces, a plurality of passive nodes between the interfaces, a plurality of optical network units connected to the plurality of passive nodes and a detector in the second interface for detecting the degradation in power level of optical signals received from the first interface via the optical fiber. In response to detecting, the second interface is configured to switch on the second transmitter.

Various embodiments of this network are described in detail below.

In one embodiment, the second interface is configured to switch on the second transmitter of the second interface when the optical power of optical signals received with the second receiver drops below a predetermined threshold value.

In a further embodiment, the second interface is configured to switch off the second transmitter if the light level increases above the predetermined threshold value.

In a further embodiment, the second interface is configured to keep the second transmitter switched on if the light level increases above the predetermined threshold value.

In a further embodiment, the second interface is configured to switch the second transmitter off and again on in order to verify that the cable is still broken.

In a further embodiment, the second interface is configured to switch off the second transmitter if detecting with the detector abrupt changes in the amount of light after switching on the second transmitter.

In a further embodiment, the second interface is configured to switch on the second transmitter again if the light level decreases below the predetermined threshold value.

In a further embodiment, if the first and second interfaces are located in a single optical line terminal, the second interface comprises starting means for starting an auto-discovery process to register affected optical network units and updating means for updating an internal routing table of the optical line terminal in response to the result of the auto-discovery process.

In a further embodiment, if the first and second interfaces are located in different optical line terminals, the second interface comprises starting means for starting an auto-discovery process to register affected optical network units, the second interface comprises establishing means for establishing a dedicated path between the interfaces, the second interface comprises sending means for sending a notifying message to the first interface, the notifying message comprising information about the affected optical network units, the first interface comprises forwarding means for forwarding the downstream traffic of the affected optical network units to the second interface via the dedicated path, and the second interface comprises forwarding means for forwarding the affected upstream traffic from the affected optical network units to the first interface via the dedicated path.

In a further embodiment, the first interface further comprises sending means for sending to the second interface via the dedicated path which higher layer addresses are behind the affected optical network units.

In a further embodiment, the second interface comprises checking means for checking whether a packet's destination address is found in a routing table of an optical line terminal comprising the second interface, and if the destination address is found in the routing table, sending means for sending the packet according to the routing table, and if the destination address is not found in the routing table, sending the packet from the second interface to the first interface via the dedicated path.

In one embodiment, the second interface is configured to switch off the transmitter of the second interface if the first interface detects that the number of optical network units from which signals are not received increases.

In a further embodiment, if the first and second interfaces are located in a single optical line terminal, the second interface comprises starting means for starting an auto-discovery process to register affected optical network units, and updating means for updating an internal routing table of the optical line terminal in response to the result of the auto-discovery process.

In a further embodiment, if the first and second interfaces are located in different optical line terminals the first interface comprises establishing means for establishing a dedicated path between the interfaces, the second interface comprises starting means for starting an auto-discovery process to register affected optical network units, the second interface comprises sending means for sending a notifying message to the first interface, the notifying message comprising information about the affected optical network units, the first interface comprises forwarding means for forwarding the downstream traffic of the affected optical network units to the second interface via the dedicated path, and the second interface comprises forwarding means for forwarding the affected upstream traffic from the affected optical network units to the first interface via the dedicated path.

In a further embodiment, the first interface further comprises sending means for sending to the second interface via the dedicated path the higher layer addresses that are behind the affected optical network units.

In a further embodiment, the second interface comprises checking means for checking whether a packet's destination address is found in a routing table of an optical line terminal comprising the second interface, and if the destination address is found in the routing table, sending means for sending the packet according to the routing table, and if the destination address is not found in the routing table, the sending means configured to send the packet from the second interface to the first interface via the dedicated path.

According to yet a further aspect of the invention there is provided a protected single-fiber passive optical network having a first interface having a first transmitter and a first receiver, a second interface having a second transmitter and a second receiver, an optical fiber connection between the interfaces, a plurality of passive nodes between the interfaces, a plurality of optical network units connected to the plurality of passive nodes, a detecting component for detecting in the first interface that signals are not received from at least one optical network unit, and a sending unit for sending to the second interface a message to switch on the transmitter of the second interface According to another aspect of the invention there is provided an interface arrangement for a protected single-fiber passive optical network. The arrangement includes a first interface having a first transmitter coupled to the fiber for transmitting optical signals on a first wavelength and a first receiver coupled to the fiber for receiving optical signals on a second wavelength, a second interface having a second transmitter coupled to the fiber for transmitting optical signals on a second wavelength and a second receiver coupled to the fiber for receiving optical signals on a first wavelength. The arrangement further includes a detecting component for detecting that signals are not received from at least one optical network unit, and a sending unit for sending to the second interface a message to switch on the second transmitter of the second interface.

In one embodiment, the second interface is configured to switch off the transmitter of the second interface if the first interface detects that the number of optical network units from which signals are not received increases.

In a further embodiment, if the first and second interfaces are located in a single optical line terminal, the second interface comprises starting means for starting an auto-discovery process to register affected optical network units, and updating means for updating an internal routing table of the optical line terminal in response to the result of the auto-discovery process.

In a further embodiment, if the first and second interfaces are located in different optical line terminals the first interface comprises establishing means for establishing a dedicated path between the interfaces, the second interface comprises starting means for starting an auto-discovery process to register affected optical network units, the second interface comprises sending means for sending a notifying message to the first interface, the notifying message comprising information about the affected optical network units, the first interface comprises forwarding means for forwarding the downstream traffic of the affected optical network units to the second interface via the dedicated path, and the second interface comprises forwarding means for forwarding the affected upstream traffic from the affected optical network units to the first interface via the dedicated path.

In a further embodiment, the first interface further comprises sending means for sending to the second interface via the dedicated path the higher layer addresses that are behind the affected optical network units.

In a further embodiment, the second interface comprises means for checking whether a packet's destination address is found in a routing table of an optical line terminal comprising the second interface, and if the destination address is found in the routing table, sending means for sending the packet according to the routing table, and if the destination address is not found in the routing table, said sending means are configured to send the packet from the second interface to the first interface via the dedicated path.

s, the second interface comprises sending means for sending a notifying message to the first interface, the notifying message comprising information about the affected optical network units, the first interface comprises forwarding means for forwarding the downstream traffic of the affected optical network units to the second interface via the dedicated path, and the second interface comprises forwarding means for forwarding the affected upstream traffic from the affected optical network units to the first interface via the dedicated path.

In a further embodiment, the first interface further comprises sending means for sending to the second interface via the dedicated path the higher layer addresses that are behind the affected optical network units.

In a further embodiment, the second interface comprises means for checking whether a packet's destination address is found in a routing table of an optical line terminal comprising the second interface, and if the destination address is found in the routing table, sending means for sending the packet according to the routing table, and if the destination address is not found in the routing table, said sending means are configured to send the packet from the second interface to the first interface via the dedicated path.

According to yet another aspect of the invention there is provided an interface arrangement for a protected single-fiber passive optical network. The interface arrangement includes a first interface having a first transmitter coupled to the fiber for transmitting optical signals on a first wavelength and a first receiver coupled to the fiber for receiving optical signals on a second wavelength, a second interface having a second transmitter coupled to the fiber for transmitting optical signals on a second wavelength and a second receiver coupled to the fiber for receiving optical signals on a first wavelength. The arrangement further includes a detector coupled to the fiber for detecting the degradation in power level of incoming optical signals of the first wavelength via the fiber, and in response to detecting, the second interface is configured to switch on the second transmitter Several Embodiments of this aspect are described hereinafter.

In one embodiment, the second interface is configured to switch on the second transmitter when the optical power of the received optical signals of the first wavelength via the fiber drops below a predetermined threshold value.

In a further embodiment, the second interface is configured to switch off the second transmitter if the light level increases above the predetermined threshold value.

In a further embodiment, the second interface is configured to keeping the second transmitter switched on if the light level increases above the predetermined threshold value.

In a further embodiment, the second interface is configured to switch the second transmitter off and again on in order to verify that the cable is still broken.

In a further embodiment, the second interface is configured to switch off the second transmitter if the detector detects abrupt changes in the amount of light after switching on the transmitter.

In a further embodiment, the second interface is configured to switch the second transmitter again on if the light level decreases below the predetermined threshold value.

In a further embodiment, if the first and second interfaces are located in a single optical line terminal, the second interface comprises starting means for starting an auto-discovery process to register affected optical network units, and updating means for updating an internal routing table of the optical line terminal in response to the result of the auto-discovery process.

In a further embodiment, if the first and second interfaces are located in different optical line terminals the second interface comprises starting means for starting an auto-discovery process to register affected optical network units, the second interface comprises establishing means for establishing a dedicated path between the interfaces, the second interface comprises sending means for sending a notifying message to the first interface, the notifying message comprising information about the affected optical network units, the first interface comprises forwarding means for forwarding the downstream traffic of the affected optical network units to the second interface via the dedicated path, and the second interface comprises forwarding means for forwarding the affected upstream traffic from the affected optical network units to the first interface via the dedicated path.

In a further embodiment, the first interface further comprises sending means for sending to the second interface via the dedicated path which higher layer addresses are behind the affected optical network units.

In a further embodiment, the second interface comprises checking means for checking whether a packet's destination address is found in a routing table of an optical line terminal comprising the second interface, and if the destination address is found in the routing table, sending means for sending the packet according to the routing table, and if the destination address is not found in the routing table, said means for sending are configured to send the packet from the second interface to the first interface via the dedicated path.

The invention has several advantages over the prior-art solutions. For example, the invention adopts a single fiber to provide protection against single link failure or single OLT failure. Furthermore, it provides a solution for implementing fast fault detection and fault isolation. Moreover, a solution is presented for addressing how to transfer affected routing information from a working OLT to the protection OLT. More particularly, an efficient optical protection solution is disclosed, which can be used together with a higher layer protection solution. Alternatively, the higher layer protection solution can be used without the optical protection solution.

The various aspects of the invention are more cost-effective as compared with the existing approaches since only a single fiber is used. Furthermore, the embodiments of the invention requires less optical components than conventional systems.

Lastly, according to the various aspects of the invention, optical power otherwise lost because of ring protection by using 2-by-2 and 2-by-n splitters may be saved.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Figure 1:
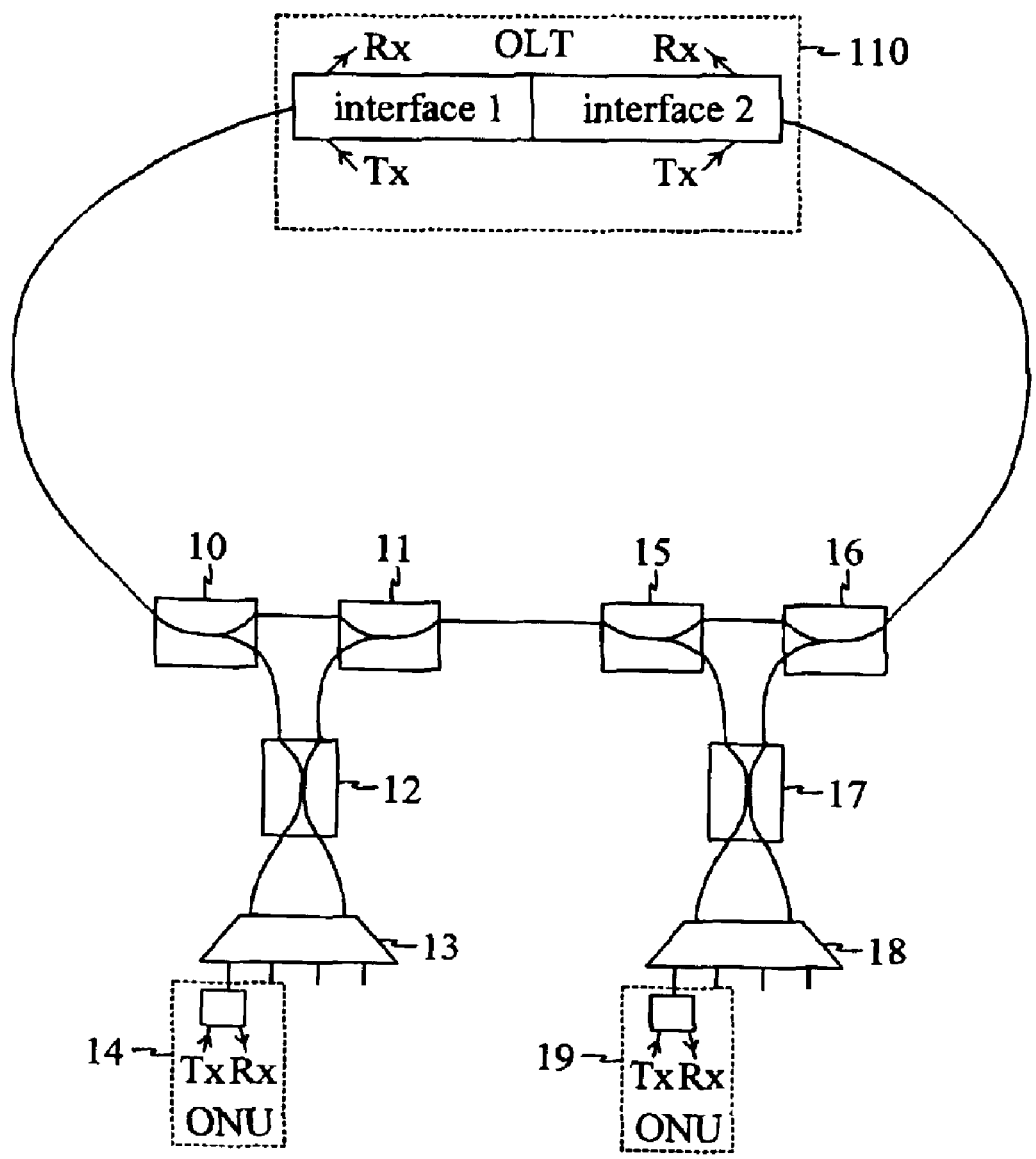
FIG. 1 is a block diagram illustrating a prior-art solution for passive optical networks.
Figure 2:
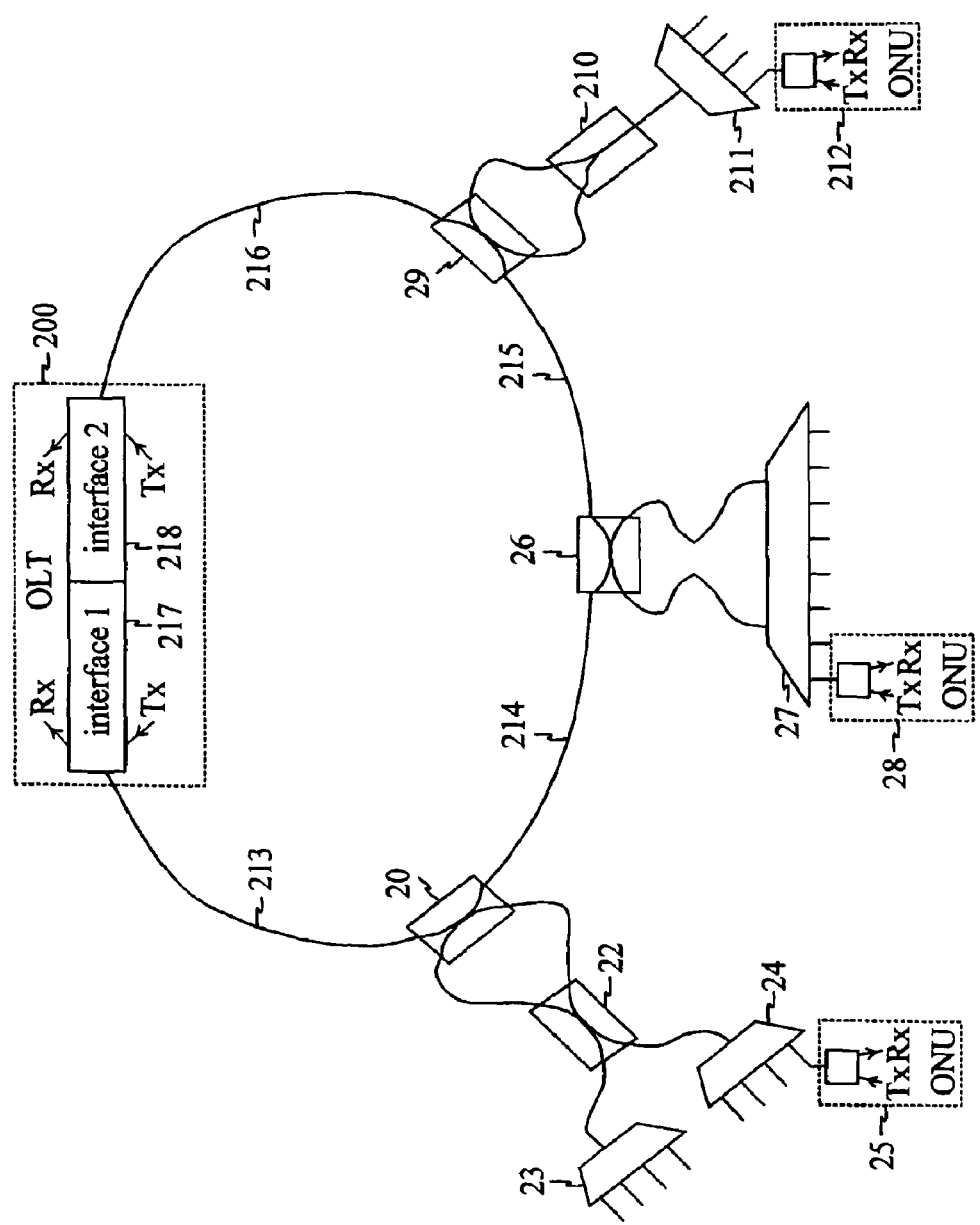
FIG. 2 is a flow diagram illustrating a ring-protected PON arrangement in accordance with the invention.

FIG. 2 describes a ring-protected PON arrangement configured to serve a number of subscribers. This arrangement includes an OLT 200 having two interfaces 217 and 218, each having a transceiver. Interface 217 is an active interface whereas interface 218 is a standby interface. The distribution network in this example includes three 2-by-2 ring splitters/combiners 20, 26, 29 connected by fiber distribution lines 213-216 to form a ring between the two interfaces 217 and 218. Each ring splitter/combiner 20, 26, 29 is linked to a number of subscriber ONUs 25, 28, 212 via intermediate splitters/combiners 22, 23, 24, 27, 210, 211. The transmitters of OLT 200 are configured to transmit optical signals on a first wavelength (for example 1490 nm). Correspondingly, the receiver of OLT 200 is configured to receive optical signals on a second wavelength (for example 1310 nm). In order to avoid interference, the transmitter of ONUs 25, 28, 212 are configured to transmit optical signals on the second wavelength. Correspondingly, the receivers of ONUs 25, 28, 212 are configured to receive optical signals on the first wavelength.

When optical signals are transmitted from OLT 200 to ONU 25, optical signals flow from active interface 217 over fiber distribution line 213 to ring splitter/combiner 20. Ring splitter/combiner 20 is configured such that a predetermined amount of the optical power of optical signals received is conveyed via optical medium 214 to ring splitter/combiner 26 from which it is transferred via optical medium 215 to ring splitter/combiner 29, etc. The remaining portion of the optical signals received at ring splitter/combiner 20 is conveyed to the downstream ports of splitter/combiner 23 and 24. The light received by ONU 25 is conveyed via splitters/combiners 22, 24.

In the reverse direction, when optical signals are transmitted from ONU 25 to OLT 200, a transceiver at ONU 25 emits an optical signal, which is conveyed via splitters/combiners 24, 22 to ring splitter/combiner 20. Ring splitter/combiner 20 splits the optical signal according to the predetermined split ratio, and the optical signal is conveyed via optical medium 213 to active interface 217 whilst the other portion of the optical signal is conveyed via optical medium 214 to ring splitter/combiner 26 and further via optical medium 215 to ring splitter/combiner 29 and again via optical medium 216 to standby interface 218. In other words, ring splitters/combiners 20, 26, 29 will split optical signals from ONUs 25, 28, 212 into different direction of physical ring, and signals can reach both active interface 217 and standby interface 218. In case of one link failure, OLT 200 can still keep all ONUs connected.

As illustrated in FIG. 2, there are both 1-by-4 splitters/combiners and 2-by-8 splitters/combiners. The 2-by-8 splitters/combiners can be used to save the number of components without changing optical properties. Of course a single 1-by-4 splitter/combiner may be used if there are less ONUs required to be fed by that particular splitter/combiner.

In one embodiment of FIG. 2, for upstream access (i.e. for traffic from ONUs to the OLT), time division multiple access (TDMA) is used. That is, every ONU 25, 28, 212 can only access the upper link at the time slot that OLT 200 authorizes it via gate messages, and therefore, no simultaneous access is allowed.

Figure 3:
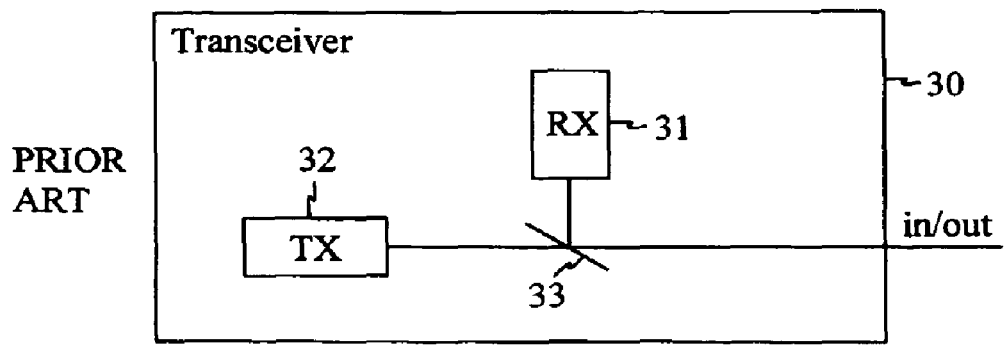
FIG. 3 discloses a transceiver used in prior-art solutions.

For comparison purposes, FIG. 3 discloses a transceiver used in prior-art solutions. In FIG. 3, an OLT interface 30 includes a transmitter 32 and a receiver 31. Transmitter 32 is configured to transmit optical signals on a first wavelength (for example 1490 nm). Correspondingly, receiver 31 is configured to receive optical signals on a second wavelength (for example 1310 nm). OLT 30 also typically includes a duplex filter 33 for filtering wavelengths of 1310 nm to receiver 31.

Figure 4:
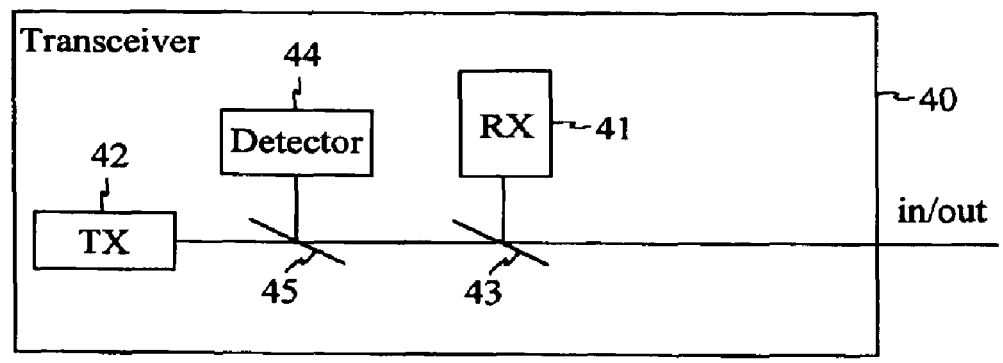
FIG. 4 is a transceiver that can be used in PON arrangements in accordance with the invention.

FIG. 4 discloses one embodiment of a transceiver in accordance with the invention. In FIG. 4, an OLT interface 40 includes a transmitter 42 and a receiver 41. Transmitter 42 is configured to transmit optical signals on a first wavelength (for example 1490 nm). Correspondingly, receiver 41 is configured to receive optical signals on a second wavelength (for example 1310 nm). OLT interface 40 includes typically also a duplex filter 43 for filtering wavelengths of 1310 nm to receiver 41. Furthermore, OLT interface 40 includes a 1490 nm detector 44 enabling optical protection switching. A splitter 45 is configured to split light to detector 44. Optical protection switching is described in more detail in reference to FIGS. 6 and 7. In the arrangement of FIG. 4, with the location of detector 44, one can take advantage of the existing duplex filter 43.

Figure 5:
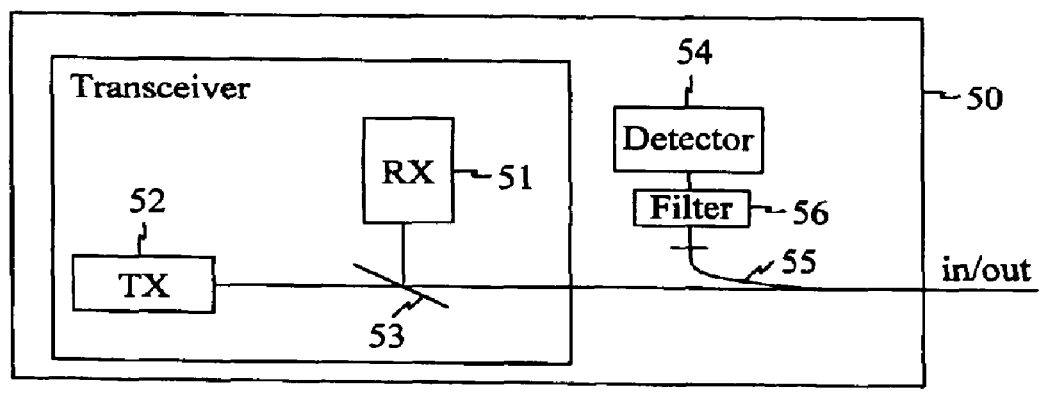
FIG. 5 is another transceiver that can be used in PON arrangements in accordance with the invention.

FIG. 5 discloses another embodiment of a transceiver. In FIG. 5, an OLT interface 50 includes a transmitter 52 and a receiver 51. Transmitter 52 is configured to transmit optical signals on a first wavelength (for example 1490 nm). Correspondingly, receiver 51 is configured to receive optical signals on a second wavelength (for example 1310 nm). OLT interface 50 includes typically also a duplex filter 53 for filtering wavelengths of 1310 nm to receiver 51. Furthermore, OLT interface 50 includes a 1490 nm detector 44 enabling optical protection switching. Optical protection switching is described in more detail with reference to FIGS. 6 and 7.

In this example detector 54 is not inside the transceiver. If detector 54 is positioned as in FIG. 5, one can take advantage of standard transceiver components.

The arrangement of FIG. 5 includes a 1-by-2 splitter 55 splitting optical power to detector 54. The splitting ratio is e.g. 90%/10%. A 1-by-2 splitter could be replaced by e.g. a wavelength sensitive splitter, which would drop a small fraction of 1490 nm light only. The optical signal to detector 54 is filtered with a filter 56. Filter 56 is e.g. a 1490 band pass filter or a 1310/1490 high pass filter.

Figure 6:
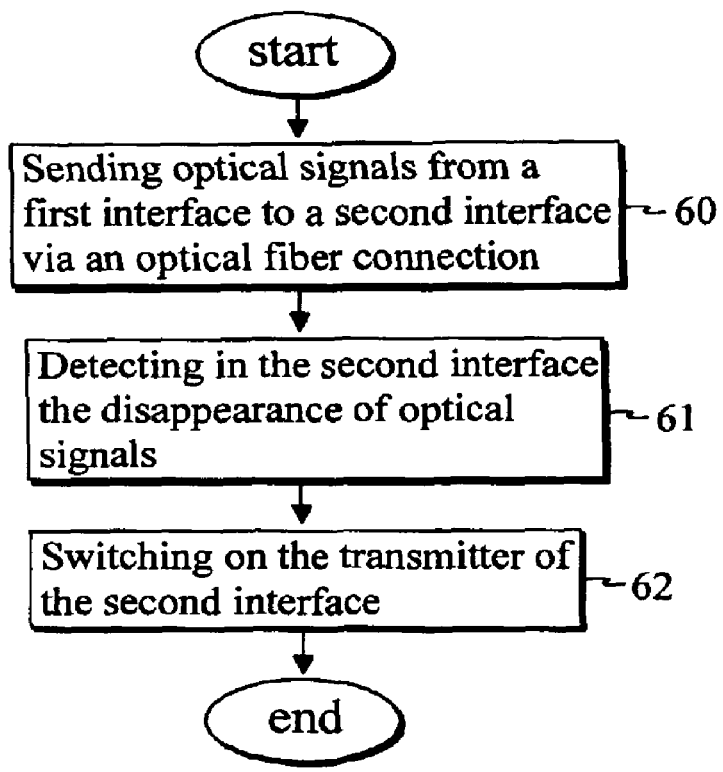
FIG. 6 illustrates a method in accordance with the invention.
Figure 7:
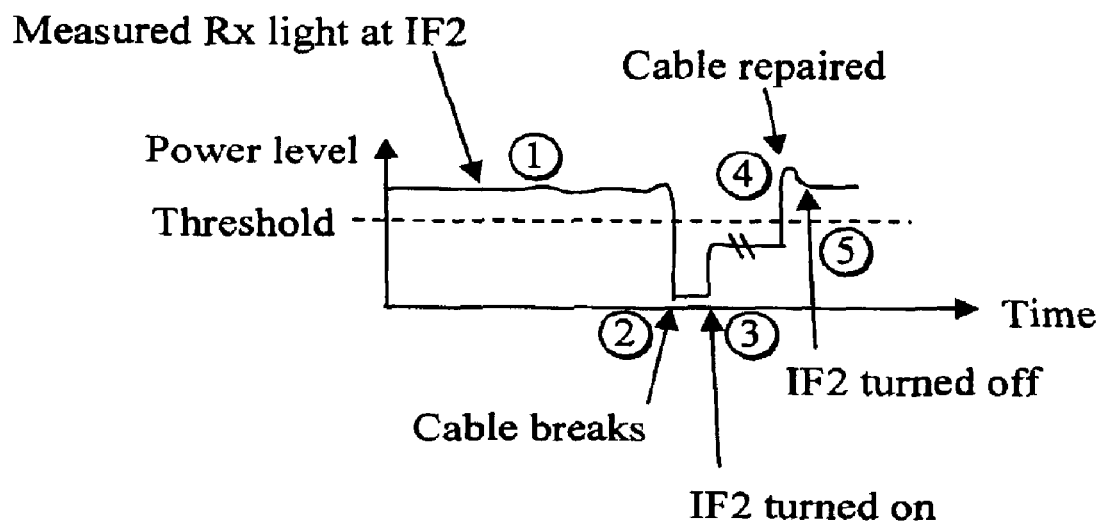
FIG. 7 is graphical illustration of power levels of optical signals in a fiber cable break situation in accordance with the invention.

FIGS. 6 and 7 describe optical protection switching in accordance with the invention. Referring to FIG. 6, optical signals are sent from a first interface of an OLT to a second interface of an OLT, as indicated in step 60. The interfaces can be in the same optical line terminal, or alternatively, in different optical line terminals. As long as the second interface receives optical signals (of a certain wavelength, e.g. 1490 nm) from the first interface, it can be assumed that the optical connection between the interfaces is undamaged.

Therefore, when the second interface detects 61 the degradation in power level of optical signals from the first interface, it switches 62 on the transmitter and starts to transmit optical signals towards the first interface. Exemplary embodiments for implementing the detection mechanism are described in reference to FIGS. 4 and 5. In brief, a detector is used to detect whether optical signals transmitted by the first interface are received.

FIG. 7 graphically illustrates the optical protection switching in accordance with the various aspects of invention. In one optical protection switching solution, a predetermined threshold value is used for determining whether the optical fiber cable between the interfaces (described in FIG. 8) is broken. The interfaces can be located either in the same OLT or in different OLTs. Normally (point 1), the received light power is above the threshold. The meaning of the threshold value is that if the power level of the optical signals received at a detector in the second interface (see FIGS. 4 and 5) drops below the threshold value (point 2), it can be assumed that the fiber cable between the two interfaces is broken.

In response to the power level drop of the received optical signals, the transmitter of the second interface is turned on (point 3). From FIG. 7 it can be seen that the power level of the received optical signals at the second interface arises due to reflection of light it transmits but still stays below the threshold value.

When the fiber cable has been repaired, there is a sudden growth in the power level of received optical signals (point 4). Because the power level now exceeds the threshold value, it can be assumed that the fiber cable has been repaired. Therefore, the transmitter of the second interface can be turned off (point 5).

The reflection caused by a broken cable has to be considered in detecting cable repair. In a single fiber ring case there is usually still about −10 dB of the transmitted power left when light is received at the other end of a repaired fiber ring. This is much more than the about −20 . . . −30 dB that is normally received from a reflection that occurs where a cable is broken. Thus, in most cases it is possible to determine a threshold value above which it is assumed that the fiber has been repaired. However, sometimes the reflected light can be larger than a useful value of a threshold that is used for protection switching.

FIGS. 6 and 7 depict a solution wherein a simple threshold value can be set to the detector. As mentioned above, there might arise situations, in which the threshold value is exceeded when the transmitter of the second interface is turned on even if the fiber cable is still broken. Therefore, this might lead to situations in which the transmitter of the second interface is turned off (because the threshold value is exceeded) although the fiber cable is still broken.

According to another embodiment, the aforementioned problem can be avoided. After switching on the second interface (protection interface), it is possible to measure how much light transmitted by the second interface is reflected back. The reflected level might be higher than the threshold value for assuming cable break, which could trick the second interface to believe that cable has been repaired. However, because it is known that the cable is broken (this can be checked by quickly turning the transmitter off and on again) and all light is reflected light, the second interface will remain turned on. As long as there are no abrupt changes in the amount of light after the second interface had been turned on, the second interface knows that the fiber cable has not been repaired.

If the power level, however, then changes in some way or another, the second interface may assume that the fiber cable has now been repaired, and therefore it can turn off the transmitter. If at this point the power level of the received optical signals decreases below the original threshold value, meaning that the fiber cable is actually still broken, the second interface switches the transmitter quickly back on. This could happen in such a short time that all registered ONUs communicating through the second interface would remain registered.

The above-mentioned approach depends on optical layer detection. However, there is also a higher layer mechanism for detecting a fiber cut and enabling the second interface. If the first interface does not receive signals from one or more ONUs, it considers that these ONUs are lost. The first interface can take actions based on whether it has PON physical topology information. If the first interface (node) is aware of the physical topology information based on the lost ONUs and physical topology information, the first interface can diagnose whether the failure is related to a fiber cut. If all the lost ONUs are behind a specific splitter on the fiber ring, it is considered that the fiber cut occurs after that splitter. Then the first interface enables the said second interface.

If physical topology information is not available, and when the first interface finds out that it has lost some ONUs, since it cannot figure out where the fault may occur, it will notify the second interface to enable the transmission. If the first and second interfaces are colocated in the same OLT, the enabling of the second interface is simple to implement. If, however, the interfaces are in different OLTs, in most situations there must be provided a dedicated connection between the interfaces in order to transmit the notification.

When both interfaces work simultaneously, it is possible to find out more of the type of failure. If ONUs lost from the first interface register to the second interface, the failure is a cable break in the fiber ring. If, on the other hand, the failure is somewhere else and the fiber ring was not broken, turning the second interface on will cause interference and subsequent loss of even more ONUs. In this case either the first interface or the second interface disables the second interface quickly. The approach takes only 1 to 2 ms to detect the fiber cut failure along the ring. To avoid frequent switches of the second interface due to other failures, such as an ONU failure or the fiber cut from a splitter to an ONU, the operator can set a threshold for the number of the lost ONUs. Therefore, in preferred embodiments, only when the number of lost ONUs is more than a set threshold, the first interface will notify the second interface and enable transmission.

After a proper diagnosis of the fiber failure and enabling the second interface, an auto-discovery mechanism is performed in the second interface to synchronize ONUs with the second interface and measure the round trip delay between the second interface and its attached ONUs. Then the second interface will conduct round trip delay compensation and can start to send/receive traffic properly.

Figure 8A:
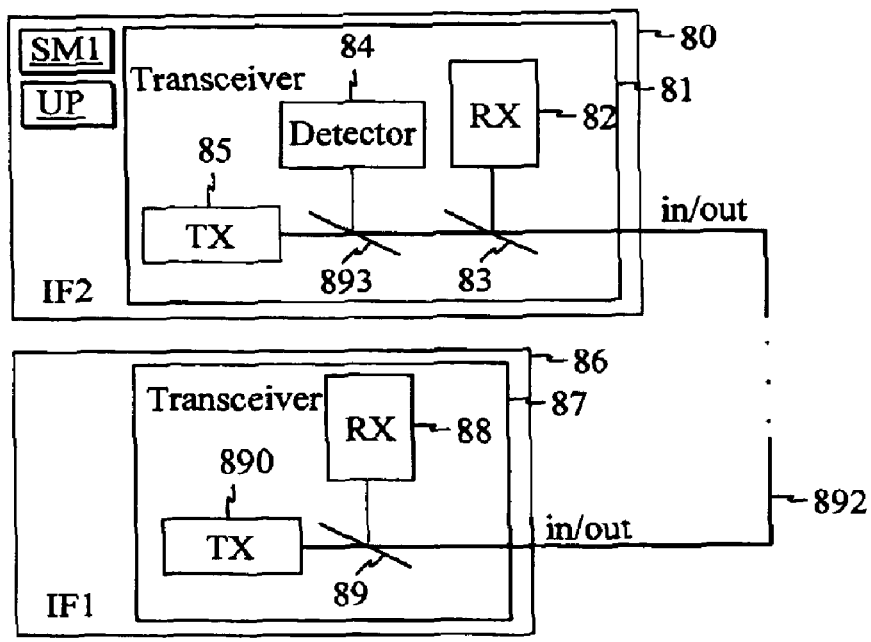
FIG. 8a is a block diagram illustrating the interface arrangement when the interfaces are located in a single optical line terminal in accordance with the invention.
Figure 8B:
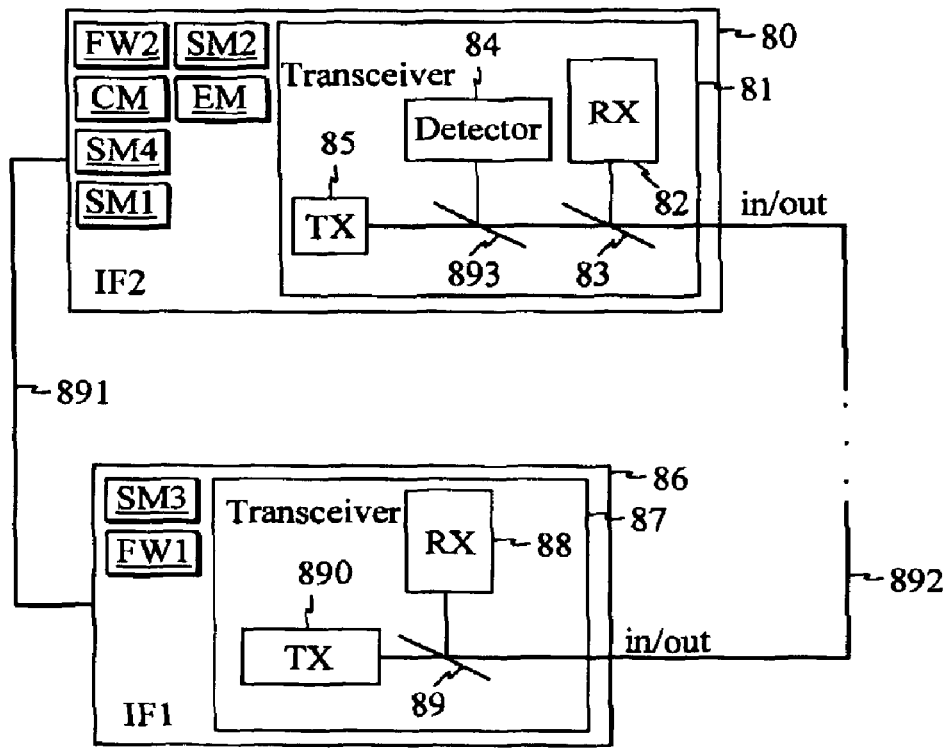
FIG. 8b is a block diagram illustrating the interface arrangement when the interfaces are located in different optical line terminals in accordance with the invention.

FIGS. 8a and 8b illustrate embodiments for interface arrangements of a passive optical network with the optical layer failure detection approach in accordance with the invention. The arrangements of FIGS. 8a and 8b enable optical protection switching which was described in reference to FIGS. 6 and 7.

The first interface 86 of an OLT includes a transceiver 87 including a transmitter 890 and a receiver 88. Transmitter 890 is configured to transmit optical signals on a first wavelength (for example 1490 nm). Correspondingly, receiver 88 is configured to receive optical signals on a second wavelength (for example 1310 nm). The first interface 86 of the OLT includes also a duplex filter 89 for filtering wavelengths of 1310 nm to receiver 88.

The second interface 80 of an OLT includes a transceiver 81 having a transmitter 85 and a receiver 82. Transmitter 85 is configured to transmit optical signals on a first wavelength (for example 1490 nm). Correspondingly, receiver 82 is configured to receive optical signals on a second wavelength (for example 1310 nm). The second interface 80 of the OLT also includes a duplex filter 83 for filtering wavelengths of 1310 nm to receiver 82. Furthermore, in a preferred embodiment, the second interface 80 includes a 1490 nm detector 84 enabling optical protection switching. A splitter 893 is configured to split light to detector 84. Alternatively, detector 84 can be outside transceiver 81 instead of being inside transceiver 81.

The arrangements of FIGS. 8a and 8b also include an optical medium 892 between the two interfaces 80, 86.

Figure 9:
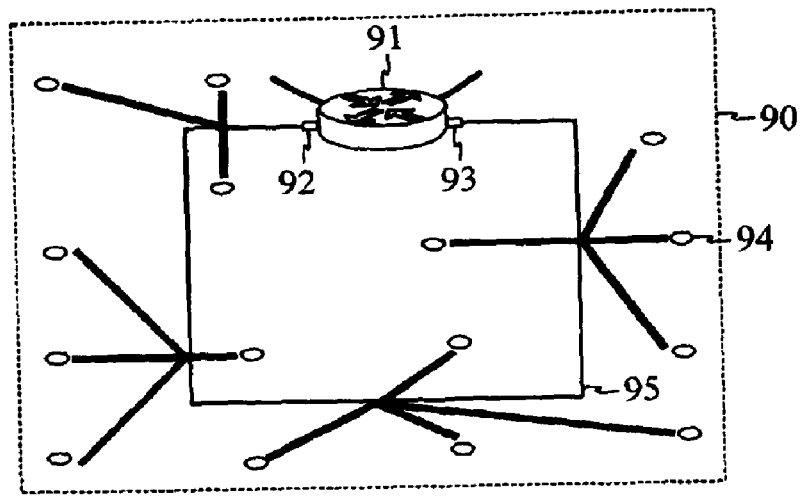
FIG. 9 illustrates an exemplary network topology in accordance with the invention.
Figure 10:
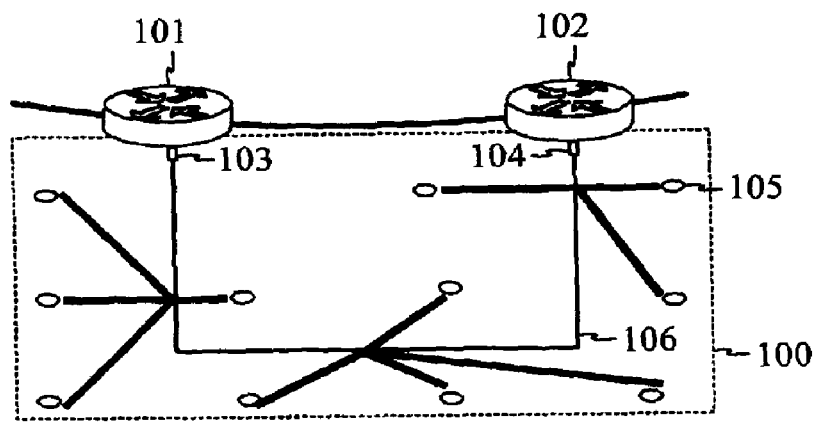
FIG. 10 illustrates an exemplary network topology in accordance with the invention.
Figure 11:
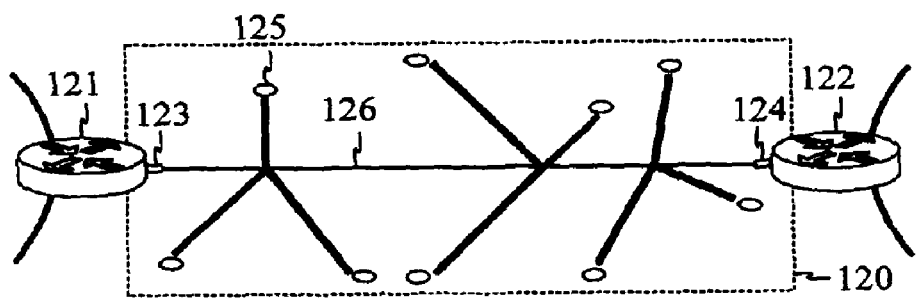
FIG. 11 illustrates an exemplary network topology in accordance with the invention.

The difference between FIGS. 8a and 8b is that in FIG. 8a interfaces 80, 86 are colocated at the same OLT (router), as shown in FIG. 9, and in FIG. 8b interfaces 80, 86 are located at different OLTs (routers), as shown in FIGS. 10 and 11. The routers link a PON to an external network. The interfaces consist of a physical protocol layer, as well as higher layer or layers. Thus, routers represent here equipment having a higher protocol layer or layers. Typical protocol layers are Ethernet, ATM (asynchronous transfer mode), or IP (Internet Protocol) layer or a combination of layers. The following describes how higher layer operation may be enhanced by signaling between routers to ensure fast protection switching.

For the colocation case (FIG. 8a), the node where interfaces 80 and 86 are located controls directly both interfaces. When a fiber cable break occurs, after detecting and diagnosing which the affected ONUs are, an OLT 91 in FIG. 9 updates its internal routing table without advertising a PON failure to the rest of the routers in an external network, thus keeping protection switching local and quick. The traffic destined/originated to the affected ONUs will be sent/received through interface 80 instead of interface 86.

In the non-colocation case (FIG. 8b) interfaces 86 and 80 are in separate nodes, which are able to communicate which each other through a dedicated path 891. If a fiber cable break occurs in the PON, the traffic going to the affected ONUs (ONUs that cannot be reached by interface 86) has to be rerouted to interface 80. In the case of an optical detection of a failure, as interface 80 detects a cable break using detector 84, it activates its transmitter 85, and starts an auto-discovery process to register the affected ONUs. At the same time, interface 80 sends a path establishment request to interface 86, and interface 86 replies with PATH-ACK. If interface 80 receives the PATH-ACK, the path is setup. Next, interface 80 will send notification message with the affected ONUs' information along the established path 891 to interface 86. The path establishment described above can be achieved by using a signaling protocol. For example, an extension of IETF (Internet Engineering Task Force) developed RSVP (Resource Reservation Set-up Protocol) or CR-LDP (Constraint-based Routing-Label Distribution Protocol) can be used to carry the needed information. The path can be used to exchange information and payload between the two routers without affecting packet forwarding in the rest of the external network. Thus, quick protection actions and rerouting of packets between the two routers can be accomplished. After that interface 86 is notified of the failure and the affected ONUs so that interface 86 is able to stop sending traffic to the affected ONUs.

In the case where optical detection is not used, the detection of a failure relies on the ability of interface 86 to recognize at a higher layer that ONUs have been lost from the PON, as described earlier. Thus, the path initialization described above is initiated in interface 86 instead of interface 80.

Interface 86 notifies the router that it is attached to, to forward the affected downstream traffic to interface 80 using dedicated path 891. Interface 80 cannot simply forward all of its received upstream traffic to interface 86. Otherwise, a loop may occur. FIG. 10 shows an implementation for the non-colocation case. There, an interface 103 corresponds to interface 86 in FIG. 8b and an interface 104 corresponds to interface 80 in FIG. 8b. When a router 102 receives upstream traffic from a PON, and if it sends all packets to router 101, then router 101 processes these packets as they were originated from itself, some packets may travel through router 102 to their destinations, thus the loop occurs. To solve this problem, when an upstream packet arrives in router 102, router 102 checks the IP packet's destination address from its routing table, and if the packet's address is in the routing table, router 102 sends the packet according to the routing table. Otherwise, router 102 simply sends the packet to router 101 via the established dedicated path between router 101 and 102. The advantage for this approach is to keep the routing tables of the external network unchanged. When protection actions are complete, routers 101 and 102 may advertise the new stabilized topology to the external network. Thus, the dedicated path between routers 101 and 102, otherwise consuming possibly excess bandwidth, is freed from payload traffic. FIG. 9 OLT 91 updates its internal routing table, the traffic destined/originated to the affected ONUs will be sent/received through interface 93 instead of interface 92.

For achieving the aforementioned functionality for a colocation situation with optical detection such as that illustrated in FIG. 8a, interface 80 includes a starting component SM1 for starting an auto-discovery process to register affected optical network units. Interface 80 may further include an updating component UP for updating an internal routing table of the optical line terminal in response to the result of the auto-discovery process.

For achieving the aforementioned functionality for a non-colocation situation with optical detection illustrated in FIG. 8b, interface 80 includes a starting component SM1 for starting an auto-discovery process to register affected optical network units, an establishing component EM for establishing the dedicated path 891 between interfaces 80, 86, and a sending unit SM2 for sending a notifying message to interface 8. The notifying message includes information about the affected optical network units. The interface further includes a forwarding component FW2 for forwarding the affected upstream traffic from the affected optical network units to interface 86 via dedicated path 891. Interface 86 includes a forwarding component FW1 for forwarding the downstream traffic of the affected optical network units to interface 80 via a dedicated path 891.

Furthermore, interface 86 may include a sending unit SM3 for sending to interface 80 via dedicated path 891 the higher layer addresses that are behind the affected optical network units. Moreover, Interface 80 may include a checking mechanism CM for checking whether a packet's destination address is found in a routing table of an optical line terminal including interface 80 and a sending unit SM4 for sending the packet according to the routing table. If the destination address is not found in the routing table, the sending unit sends the packet from interface 80 to interface 86 via dedicated path 891.

Figure 8C:
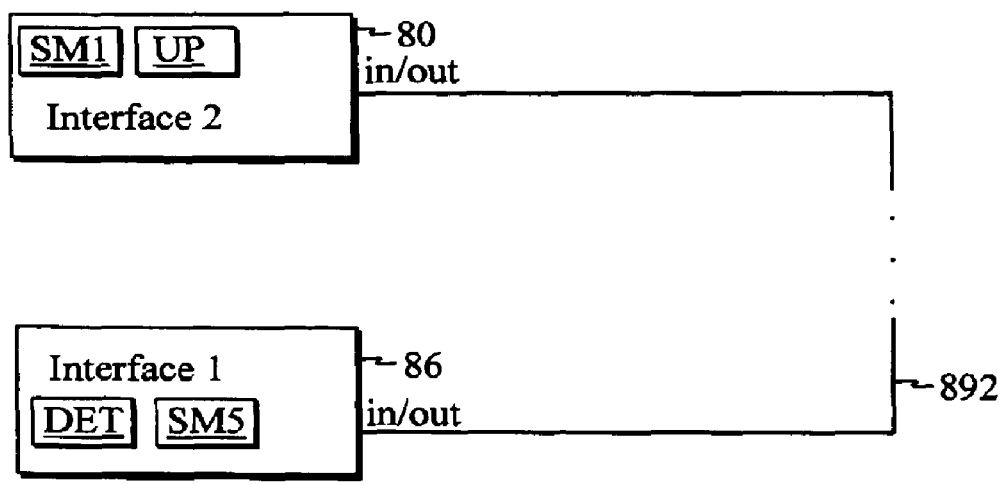
FIG. 8c is a block diagram illustrating the interface arrangement when the interfaces are colocated in a single optical line terminal in accordance with the invention.

For achieving the aforementioned functionality for a colocation situation with only higher layer failure detection illustrated in FIG. 8c, interface 80 includes a starting component SM1 for starting an auto-discovery process to register affected optical network units. Further, an updating portion UP is included for updating an internal routing table of the optical line terminal in response to the result of the auto-discovery process. Correspondingly, interface 86 includes a detecting unit DET for detecting that signals are not received from at least one optical network unit and a sending unit SM5 for sending to interface 80 a message to switch on the transmitter for interface 80.

Figure 8D:
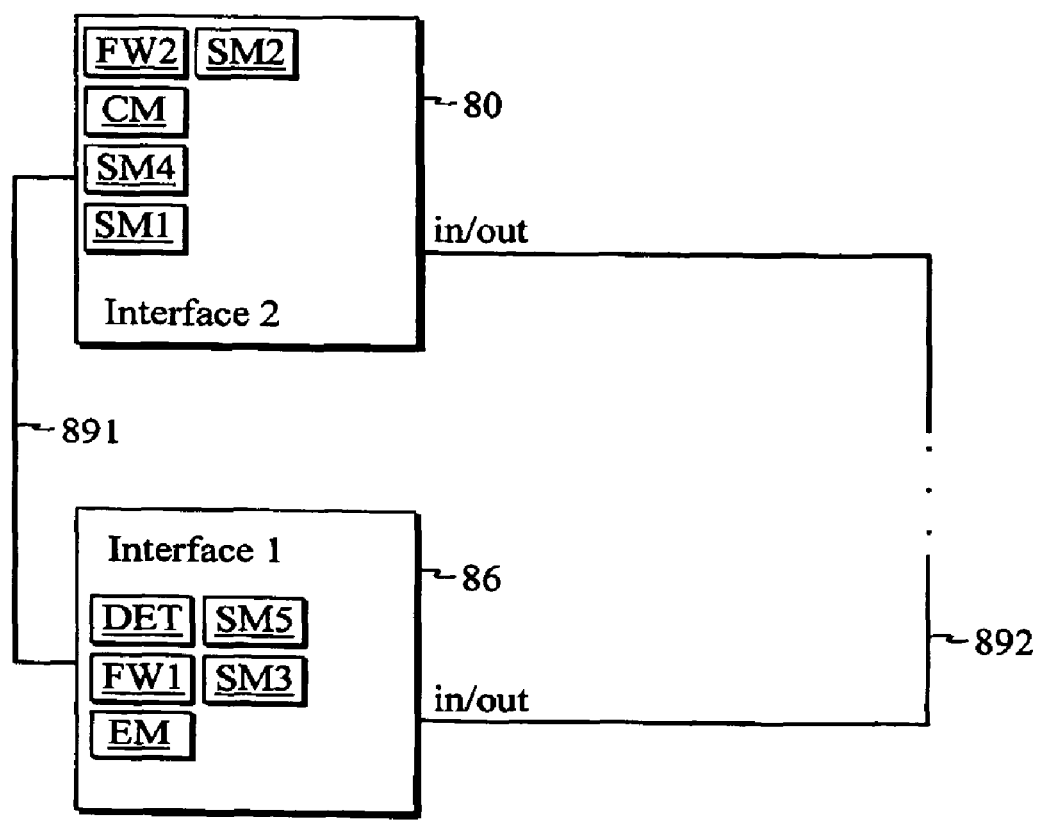
FIG. 8d is a block diagram illustrating the interface arrangement when the interfaces are located in different optical line terminals in accordance with the invention.

For achieving the aforementioned functionality for a non-colocation situation with only higher layer failure detection illustrated in FIG. 8d, interface 80 may include a starting component SM1 for starting an auto-discovery process to register affected optical network units, and a sending unit SM2 for sending a notifying message to interface 86. The notifying message includes information about the affected optical network units. The interface may further include a forwarding component FW2 for forwarding the affected upstream traffic from the affected optical network units to interface 86 via dedicated path 891. Interface 86 includes a forwarding component FW1 for forwarding the downstream traffic of the affected optical network units to interface 80 via dedicated path 891. Furthermore, interface 80 includes a checking mechanism CM for checking whether a packet's destination address is found in a routing table of an optical line terminal, which consists of interface 80 and a sending unit SM4 for sending the packet according to the routing table. If the destination address is not found in the routing table, sending unit SM4 sends the packet from interface 80 to interface 86 via dedicated path 891.

Correspondingly, interface 86 includes a detecting unit DET for detecting that signals are not received from at least one optical network unit and a sending unit SM5 for sending to interface 80 a message to switch on the transmitter of interface 80. Furthermore, interface 86 includes a forwarding component FW1 for forwarding the downstream traffic of the affected optical network units to interface 80 via dedicated path 891, a sending unit SM3 for sending to interface 80 via dedicated path 891 which higher layer addresses are behind the affected optical network units, and an establishing mechanism EM for establishing the dedicated path 891 between interfaces 80,86.

The aforementioned components, units and/or mechanisms may be implemented with hardware and/or software solutions known to those skilled in the art, and therefore specific examples are not described in more detail.

FIGS. 9-11 illustrate exemplary passive optical network topologies in which the invention might be used. Each of the topologies is greatly simplified and is presented only for demonstrative purposes. FIG. 9 describes a loop topology for passive optical networks 90 in which both interfaces 92, 93 are in the same OLT 91. Several ONUs 94 are connected to the optical medium 95. FIG. 10 describes a U chain topology for passive optical networks 100 in which the first interface 103 is in OLT 101 and the second interface 104 in OLT 102. Several ONUs 105 are connected to the optical medium 106. FIG. 11 describes a loop topology for passive optical networks 120 in which the first interface 123 is in OLT 121 and the second interface 124 in OLT 122. Several ONUs 125 are connected to the optical medium 126.

Optical protection switching provides a fast detection solution for detecting cable breaks. It was described earlier that there exists a connection between the two interfaces (other than the optical medium between the interfaces). This enables fast rerouting of information of affected ONUs. However, it must be noted that the Internet Protocol (IP) layer is able to learn the altered network topology without direct signaling between the OLTs, but this learning may take many seconds where packets are lost. This solution is therefore more ineffective than the solutions described herein.

Thus, optical protection switching in accordance with various aspects of the invention can be used in FIGS. 9 and 10, whereas in FIG. 11 it is more difficult because the connection between routers 121 and 122 (other than optical medium 126) may involve multiple hops and domains. Therefore, a dedicated path between the routers is more difficult to set up, has larger latency, and may be clearly more bandwidth constrained than a direct or a few-hop connection. If failure detection is based on the detector in the second interface, for example in router 102, the second interface will activate itself. After some time, routing information will be updated using normal IP routing protocols.

If, on the other hand, failure detection is based on the first interface noticing a loss of ONUs at a higher layer, now in router 101, router 101 must send a notification message to router 102 so that the second interface can activate itself Because in this detection scheme there is a significant probability that the second interface must be deactivated immediately upon activation, special care should be taken that messages between the two routers propagate as quickly as the circumstances allow.

Figure 12:
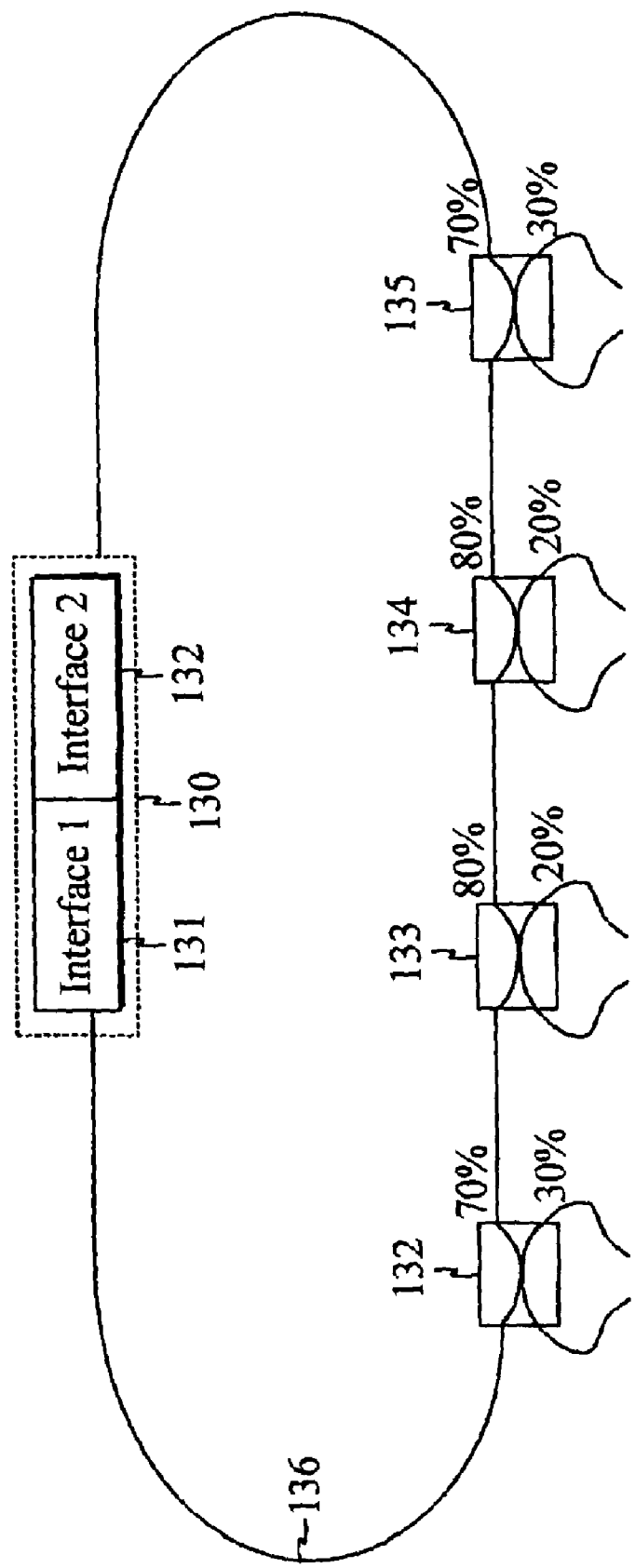
FIG. 12 illustrates the concept of a variable symmetric split ratio in accordance with the invention.

FIG. 12 illustrates the concept of a variable symmetric split ratio solution. The concept is illustrated in a ring-protected passive optical network comprising an optical line terminal (OLT) 130 including an active interface 131 and a backup interface 132. The PON includes four ring splitters/combiners 132, 133, 134, 135. The aforementioned elements are connected to each other as shown in FIG. 12 via an optical medium 136. The two interfaces can also be located in different OLTs (not shown in FIG. 12).

Normally one of the two interfaces 131, 132 in OLT 130 is active. The interface sends light at one wavelength, normally 1490 nm, and receives at another, normally 1310 nm. Ring splitters/combiners 132, 133, 134, 135 are star points, which divide optical signals to ONUs (not shown in FIG. 12).

In a bi-directional ring (such as a ring-protected passive optical network) the first drop node in one direction is the last node in the other direction. If the method applicable to a unidirectional fiber was be used here (i.e. dropping only a small fraction of optical power from the ring in drop nodes near the origin and larger fraction in subsequent drop nodes), the first drop in the reverse direction would tap more power than necessary and the last nodes would not receive enough power. Following from that, tapping equal to a fraction of light at each drop node is a suitable solution. Normally, the same splitting ratio is used to drop power from the ring in ring splitter/combiners 132, 133, 134, 135. However, the number of ONUs may be increased when a variable symmetric split ratio scheme is used in which a larger proportion of light is dropped at ring splitters/combiners 132, 133, 134, 135, which are near to OLT 130, and less power is dropped at ring splitters/combiners 132, 133, 134, 135, which are midway through the ring.

The following table shows how the number of ONUs can be increased by the variable symmetric split ratio in a system where a power budget of 24 dB is assumed. 1 Constant split ratio Variable symmetric split ratio 8 per drop, 3 drops 8 per drop, 4 drops Drop % dB Drop % dB 20% −19.4 30% −17.6 20%−21.3 20%−22.0 20%−23.2 20%−23.9 20%−25.1 30% −24.0

A single fiber ring with, for example, 2 km distance between each ring splitter/combiner 132, 133, 134, 135 is used as the topology. Each ring splitter/combiner 132, 133, 134, 135 distributes the signal to eight ONUs. The dB values indicate received optical power at OLT 130 relative to the transmitted power at ONUs (upstream direction used in the calculation is more critical in terms of power budget because attenuation is larger at wavelengths usually used by ONUs). In a constant split ratio, a 20% drop ratio in every ring splitter/combiner 132, 133, 134, 135 gives best performance for a three-node system assuming a stock of splitters with 10% step between each model. However, at a 24 dB power budget there is not enough power at the fourth node. Thus, three nodes is the maximum number of nodes. If on the other hand, a variable symmetric split ratio is used, the fourth node will just fit into the power budget.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. An optical network comprising:
    a first interface comprising a first transmitter and a first receiver, wherein the first interface is configured to generate an optical signal;
    a second interface comprising a second transmitter and a second receiver;
    an optical medium connecting the first and second interfaces wherein the optical medium comprises a midpoint located half the distance between the first and second interfaces along the optical medium; and
    a plurality of splitter/combiners configured to distribute the optical signal generated by the first interface along the optical medium at respective split ratios, wherein a first split ratio of a first of the plurality of splitter/combiners is different from a second split ratio of a second of the plurality of splitter/combiners, and wherein a splitter/combiner nearer to the first interface along the optical medium that to the midpoint is configured to drop a higher ratio of power to an optical network unit than a splitter/combiner that is nearer to the midpoint along the optical medium than to the first interface.

2. The optical network of claim 1, wherein each of the plurality of splitter/combiners are connected to one or more optical network units via optical fibers.

3. The optical network of claim 2, wherein the first and second interfaces are connected to the one or more optical network units only by passive components.

4. The optical network of claim 1, wherein each of the plurality of splitter/combiners is part of a passive node that is configured to transmit signals without using electricity.

5. The optical network of claim 1, wherein each of the plurality of splitter/combiners is a 2-by-2 splitter/combiner.

6. The optical network of claim 1, wherein the first and second interfaces are co-located at a single optical line terminal, wherein the first interface comprises an active interface, and wherein the second interface comprises a back-up interface.

7. The optical network of claim 6, wherein splitter/combiners a smaller distance along the optical medium from the single optical line terminal are configured to drop less power than splitter/combiners located a greater distance along the optical medium from the single optical line terminal.

8. The optical network of claim 1, wherein the first and second interfaces are located in different optical line terminals.

9. The optical network of claim 1, wherein the plurality of splitter/combiners have a variable symmetric distribution of split ratios such that a splitter/combiner nearest the first interface along the optical medium has a same first drop ratio as a splitter/combiner nearest the second interface along the optical medium and a splitter/combiner second nearest the first interface along the optical medium has a same second drop ratio as a splitter/combiner second nearest the second interface along the optical medium, and wherein the first drop ratio is greater than the second drop ratio.

10. The optical network of claim 1, wherein the second interface further comprises a detector configured to detect a degradation in power level of optical signals received from the first interface via the optical medium, and wherein the second interface is configured to switch on the second transmitter in response to detection of the degradation in power level.

11. A method comprising:
    receiving an optical signal at a first splitter/combiner from a first interface at a first power, wherein the optical signal is received along an optical medium;
    splitting the first power of the optical signal according to a first splitting ratio;
    receiving the optical signal from the first interface at a second splitter/combiner at a second power; and
    splitting the second power of the optical signal according to a second splitting ratio that is different from the first splitting ratio;
    wherein the optical medium comprises a midpoint located half the distance between the first interface and a second interface along the optical medium;
    wherein the first splitter/combiner is located nearer to the first interface along the optical medium than to the midpoint, and wherein the second splitter/combiner is located nearer to the midpoint along the optical medium than to the first interface; and
    wherein the first splitter/combiner has a greater drop ratio than the second splitter/combiner.

12. The method of claim 11, wherein the first and second splitter/combiners are configured to generate optical signals.

13. The method of claim 12, wherein the first splitter/combiner is located nearer the first interface than the second splitter/combiner.

14. The method of claim 12, further comprising:
    receiving the optical signal at a third splitter/combiner at a third power;
    splitting the third power of the optical signal according to the second splitting ratio;
    receiving the optical signal at a fourth splitter/combiner at a fourth power; and
    splitting the fourth power of the optical signal according to the first splitting ratio.

15. The method of claim 14, wherein of the first, second, third, and fourth splitter/combiners the first splitter/combiner is located nearest the first interface, wherein of the first, second, third, and fourth splitter/combiners the fourth splitter/combiner is located nearest the second interface, wherein of the first, second, third, and fourth splitter/combiners the second splitter/combiner is located second nearest the first interface, and wherein of the first, second, third, and fourth splitter/combiners the third splitter/combiner is located second nearest the second interface.

16. The method of claim 12, wherein the first and second interfaces are co-located at a single optical line terminal, wherein the first interface comprises an active interface, and wherein the second interface comprises a back-up interface.

17. The method of claim 12, wherein the first and second interfaces are located in different optical line terminals.

18. The method of claim 11, wherein the first and second splitter/combiners are each part of respective passive nodes that are configured to transmit signals without using electricity.

19. The method of claim 11, wherein the first and second splitter/combiners comprise 2-by-2 splitter/combiners.

* * * * *

UNITED STATES PATENT AND TRADEMARK OFFICE
CERTIFICATE OF CORRECTION

| | | |
|---|---|---|
| PATENT NO. | : 8,145,054 B2 | Page 1 of 1 |
| APPLICATION NO. | : 13/044714 | |
| DATED | : March 27, 2012 | |
| INVENTOR(S) | : Ye et al. | |

It is certified that error appears in the above-identified patent and that said Letters Patent is hereby corrected as shown below:

In Column 1, Line 22, delete "(ONU)" and insert -- (ONUs) --, therefor.

In Column 6, Line 32, delete "interface" and insert -- interface. --, therefor.

In Column 7, Line 58, delete "transmitter" and insert -- transmitter. --, therefor.

In Column 9, Line 19, delete "is" and insert -- is a --, therefor.

In Column 16, Line 36, delete "itself" and insert -- itself. --, therefor.

In Column 17, Line 13, delete "-24.0" and insert -- -24.0. --, therefor.

In Column 17, Lines 42-43, in Claim 1, delete "interfaces" and insert -- interfaces, --, therefor.

In Column 17, Line 53, in Claim 1, delete "that" and insert -- than --, therefor.

Signed and Sealed this
Eleventh Day of September, 2012

David J. Kappos
*Director of the United States Patent and Trademark Office*